(12) United States Patent
Jung et al.

(10) Patent No.: US 9,117,290 B2
(45) Date of Patent: Aug. 25, 2015

(54) APPARATUS AND METHOD FOR FILLING HOLE AREA OF IMAGE

(71) Applicant: SAMSUNG ELECTRONICS CO., LTD., Suwon (KR)

(72) Inventors: Seung Won Jung, Seoul (KR); Kee Chang Lee, Yongin (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 101 days.

(21) Appl. No.: 13/946,578

(22) Filed: Jul. 19, 2013

(65) Prior Publication Data

US 2014/0023289 A1 Jan. 23, 2014

Related U.S. Application Data

(60) Provisional application No. 61/673,965, filed on Jul. 20, 2012.

(30) Foreign Application Priority Data

Oct. 29, 2012 (KR) ........................ 10-2012-0120531

(51) Int. Cl.
*G06K 9/46* (2006.01)
*G06T 5/30* (2006.01)
*G06T 5/00* (2006.01)

(52) U.S. Cl.
CPC .. *G06T 5/30* (2013.01); *G06T 5/005* (2013.01)

(58) Field of Classification Search
USPC ......... 382/257, 112, 275, 298, 149, 173, 180, 382/147, 204; 345/419, 421; 356/239.3; 348/E13.062, 126; 375/240.13, 375/E7.077; 358/3.26; 235/462.1
See application file for complete search history.

(56) References Cited

U.S. PATENT DOCUMENTS

| | | | |
|---|---|---|---|
| 6,243,419 B1 * | 6/2001 | Satou et al. | 375/240.13 |
| 6,636,632 B2 * | 10/2003 | Okada | 382/194 |
| 7,224,355 B2 * | 5/2007 | Auberger et al. | 345/419 |
| 7,366,357 B2 | 4/2008 | Curry et al. | 382/173 |
| 8,041,139 B2 | 10/2011 | Ma | 382/181 |
| 8,494,304 B2 * | 7/2013 | Venable et al. | 382/275 |
| 2009/0016640 A1 | 1/2009 | Klein Gunnewiek | 382/300 |
| 2010/0289815 A1 | 11/2010 | Varekamp et al. | 345/606 |
| 2011/0069237 A1 | 3/2011 | Wang et al. | 375/240.16 |

FOREIGN PATENT DOCUMENTS

| | | |
|---|---|---|
| JP | 8-147462 A | 6/1996 |
| KR | 2001-0090568 | 10/2001 |

* cited by examiner

*Primary Examiner* — Anh Do
(74) *Attorney, Agent, or Firm* — Harness, Dickey & Pierce, P.L.C.

(57) ABSTRACT

Provided is an image processing apparatus and method for filling a hole area in an image. The image processing apparatus may include a candidate pixel setting unit to set a plurality of candidate pixels corresponding to at least one hole pixel in a hole area using neighboring pixels around the hole area, and a pixel value determining unit to determine a pixel value of the hole pixel using the plurality of candidate pixels.

17 Claims, 6 Drawing Sheets

APPARATUS AND METHOD FOR FILLING HOLE AREA OF IMAGE

CROSS-REFERENCE TO RELATED APPLICATION

This application claims the priority benefit under 35 U.S.C. §119(e) of U.S. Provisional Application No. 61/673,965, filed on Jul. 20, 2012, in the U.S. Patent and Trademark Office, and under 35 U.S.C. §119(a) of Korean Patent Application No. 10-2012-0120531, filed on Oct. 29, 2012, in the Korean Intellectual Property Office, the entire disclosures of each of which are hereby incorporated by reference.

BACKGROUND

1. Field

Example embodiments of the following disclosure relate to an apparatus and method for filling a hole area in an image, and more particularly, to an apparatus and method for filling a hole area in an image that may set a plurality of candidate pixels using neighboring pixels of the hole area and may fill the hole area in the image based on the candidate pixels.

2. Description of the Related Art

A portion of data may be absent in an image during acquisition, transmission, and rendering of the image. When the image is provided on a display, a hole in which data is absent may be generated.

When an electric charge exceeds a limit of a capacitor in each pixel during acquisition of an image, data may be absent in a corresponding pixel and a hole may be generated.

Also, when an error occurs during transmission of an image, data may be absent in a portion of the image and a hole may be generated. In this instance, since the image is encoded for each block, the hole may be generated for each block.

Further, a hole may be caused by an occlusion region during warping for multi-view conversion.

Accordingly, there is a demand for an efficient technique for filling a hole occurring under various conditions.

SUMMARY

The foregoing and/or other aspects are achieved by providing an apparatus for processing an image including a candidate pixel setting unit to set a plurality of candidate pixels corresponding to at least one hole pixel in a hole area using neighboring pixels around the hole area, and a pixel value determining unit to determine a pixel value of the hole pixel using the plurality of candidate pixels.

The candidate pixel may be set using a pair of neighboring pixels in a symmetric arrangement with respect to the hole pixel among the neighboring pixels.

The symmetric arrangement of the neighboring pixels may include at least one of a vertical symmetry, a horizontal symmetry, and a diagonal symmetry.

The candidate pixel may have a pixel value determined using pixel values of the pair of symmetric neighboring pixels and distances between the hole pixel and the pair of symmetric neighboring pixels.

The apparatus may further include a weight determining unit to determine a weight value of the candidate pixel using the neighboring pixels, and the pixel value of the hole pixel may be determined by applying the determined weight value to the candidate pixel.

The weight value may be determined by a first weight value, and the first weight value may be determined using a difference in pixel value between the pair of neighboring pixels.

The first weight value may be inversely proportional to the pixel value difference.

The weight value may be determined by a second weight value, and the second weight value may be determined using a distance between the hole pixel and a neighboring pixel closer to the hole pixel among the pair of neighboring pixels.

The second weight value may be inversely proportional to a distance between the hole pixel and the neighboring pixel Closer to the hole pixel.

The foregoing and/or other aspects are also achieved by providing a method of processing an image, the method including setting a plurality of candidate pixels corresponding to at least one hole pixel in a hole area using neighboring pixels around the hole area, and determining a pixel value of the hole pixel using the plurality of candidate pixels.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
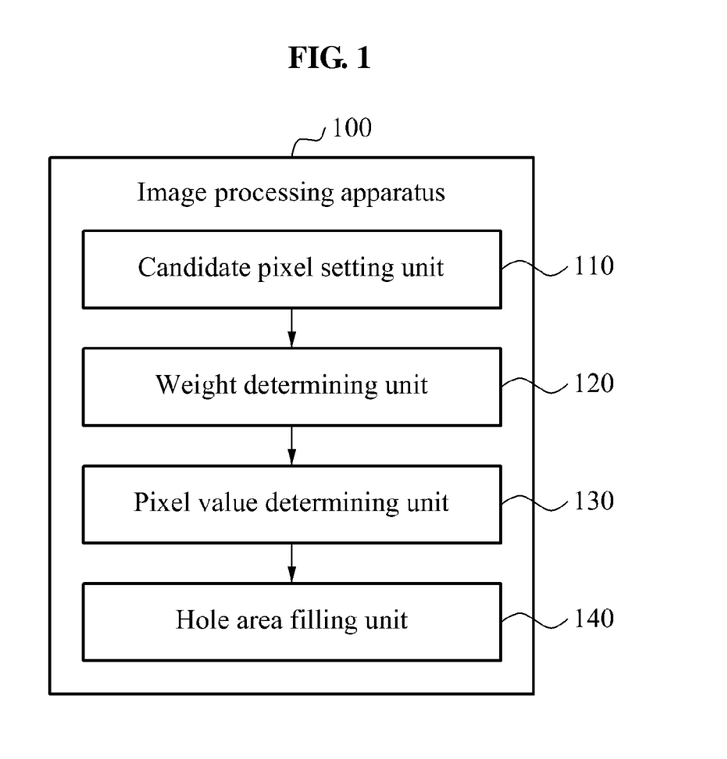
FIG. 1 illustrates an apparatus for processing an image according to an example embodiment.

FIG. 1 illustrates an apparatus 100 for processing an image according to an example embodiment.

Referring to FIG. 1, the apparatus 100 for processing an image may include a candidate pixel setting unit 110, a weight determining unit 120, a pixel value determining unit 130, and a hole area filling unit 140.

The candidate pixel setting unit 110 may set a plurality of candidate pixels corresponding to hole pixel in a hole area using neighboring pixels of the hole area. In this instance, the hole area may refer to an area in which data to be displayed is absent in an image. The hole area may occur during at least one of acquisition, transmission, and rendering of the image. The neighboring pixel may correspond to a normal pixel adjacent to the hole area. The normal pixel may refer to a pixel in which data to be displayed is present in an image, in contrast to the hole area.

The relationship between the hole pixel in the hole area and the neighboring pixel around the hole area is described in further detail with reference to FIG. 2.

The candidate pixel setting unit 110 may set the plurality of candidate pixels using a pair of neighboring pixels in a symmetric arrangement with respect to the hole pixel among the neighboring pixels. The candidate pixel setting unit 110 may set the plurality of candidate pixels using a pair of neighboring pixels in a symmetric arrangement with respect to the hole pixel in at least one direction among a vertical direction, a horizontal direction, and a diagonal direction.

Also, the candidate pixel setting unit 110 may determine a pixel value for each of the plurality of candidate pixels by setting a weight value for each neighboring pixel to be inversely proportional to a distance from the hole pixel, and by applying the weight value to a pixel value for each neighboring pixel.

Figure 3:
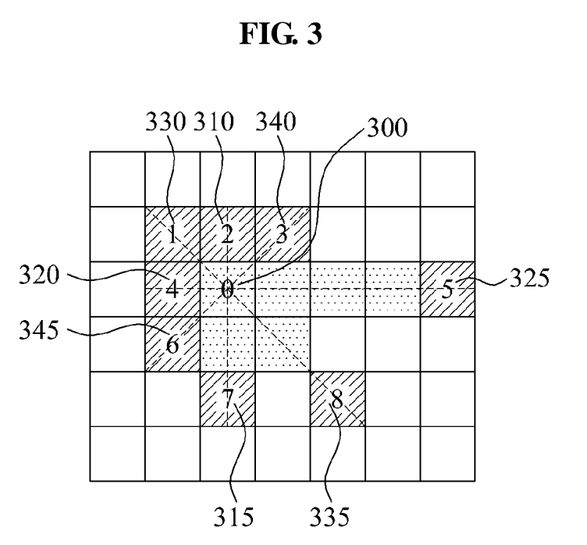
FIG. 3 illustrates an example of determining a pixel value of a hole pixel according to an example embodiment.
Figure 4:
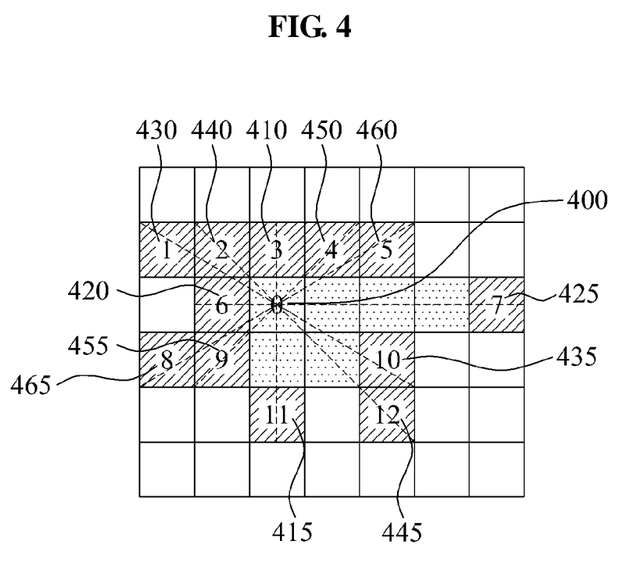
FIG. 4 illustrates another example of determining a pixel value of a hole pixel according to an example embodiment.

A further description of the setting of the candidate pixel by the candidate pixel setting unit 110 is provided in detail with reference to FIGS. 3 and 4.

The weight determining unit 120 may determine a weight value for each of the plurality of candidate pixels set by the candidate pixel setting unit 110 using neighboring pixels related to the candidate pixel. The weight determining unit 120 may determine a weight value for each of the plurality of candidate pixels for the hole pixel to be determined by the pixel value determining unit 130 to meet a first condition and a second condition. The first condition may represent that the hole pixel allows edge preservation for neighboring pixels, and the second condition may represent that the hole pixel has a pixel value close to pixel values of neighboring pixels of the hole pixel.

The weight determining unit 120 may determine the weight value of the candidate pixel using a difference in pixel values between a pair of neighboring pixels in a symmetric arrangement with respect to the hole pixel. To meet the first condition, the weight determining unit 120 may determine the weight value of the candidate pixel to be inversely proportional to the difference in pixel values between the pair of neighboring pixels related to the candidate pixel.

When the difference in pixel value between the pair of neighboring pixels related to the candidate pixel is relatively modest, the weight determining unit 120 may determine the weight value of the candidate pixel to be of a high value. When the difference in pixel value between the pair of neighboring pixels related to the candidate pixel is relatively great, the weight determining unit 120 may determine the weight value of the candidate pixel to be of a low value.

The weight determining unit 120 may determine the weight value of the candidate pixel using a distance between a pair of neighboring pixels in a symmetric arrangement with respect to the hole pixel. To meet the second condition, the weight determining unit 120 may determine the weight value of the candidate pixel to be inversely proportional to the distance between the pair of neighboring pixels related to the candidate pixel.

When the distance between the pair of neighboring pixels related to the candidate pixel is relatively short, the weight determining unit 120 may determine the weight value of the candidate pixel to be of a high value. When the distance between the pair of neighboring pixels related to the candidate pixel is relatively long, the weight determining unit 120 may the weight value of the candidate pixel to be of a low value.

The pixel value determining unit 130 may determine a pixel value of the hole pixel using the plurality of candidate pixels set by the candidate pixel setting unit 110. The pixel value determining unit 130 may apply the weight value determined by the weight determining unit 120 to the plurality of candidate pixels set by the candidate pixel setting unit 110, and may determine the pixel value of the hole pixel using the plurality of candidate pixels having the weighted pixel values.

The hole area filling unit 140 may convert the hole pixel into a normal pixel by inputting the pixel value of the hole pixel determined by the pixel value determining unit 130, to fill the hole area. The hole area filling unit 140 may allow the candidate pixel setting unit 110, the weight determining unit 120, and the pixel value determining unit 130 to use the converted normal pixel as a neighboring pixel to be used to determine a pixel value of another hole pixel. However, when an error occurs in the pixel value input into the hole pixel by the hole area filling unit 140, the error may influence the resulting pixel value of another hole pixel.

The hole area filling unit 140 may maintain the converted normal pixel as a hole pixel until the hole area is filled completely to prevent the candidate pixel setting unit 110, the weight determining unit 120, and the pixel value determining unit 130 from selecting the converted normal pixel to be a neighboring pixel.

Accordingly, the image processing apparatus 100 may fill the hole area by setting the plurality of candidate pixels using the neighboring pixels of the hole area and by determining the pixel value of the hole pixel in the hole area using the pixel values and the weight values of the candidate pixels.

Figure 2:
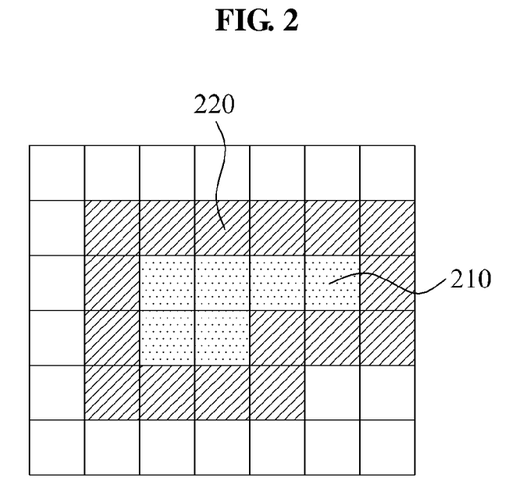
FIG. 2 illustrates an example of a hole pixel and a neighboring pixel according to an example embodiment.

FIG. 2 illustrates an example of a hole pixel and a neighboring pixel according to an example embodiment.

To determine a pixel value of hole pixel 210, a plurality of neighboring pixels 220 surrounding a hole area may be used. The plurality of neighboring pixels 220 may correspond to normal pixels.

The image processing apparatus 100 may use the plurality of neighboring pixels 220 in an intact manner or as filtered neighboring pixels. In this instance, filtering may include filtering for removing noise in an image and filtering for filling a hole area and recovering sharp features in the hole area.

The image processing apparatus 100 may select neighboring pixels located in a predetermined direction from the hole pixel 210 among the neighboring pixels 220, and may set a plurality of candidate pixels using the selected neighboring pixels.

FIG. 3 illustrates an example of determining a pixel value of a hole pixel according to an example embodiment.

The candidate pixel setting unit 110 may set four candidate pixels using neighboring pixels located in four directions from a hole pixel 300.

The candidate pixel setting unit 110 may set a candidate pixel C1 using a neighboring pixel 2 310 located closest to the hole pixel 300 in an upward direction and a neighboring pixel 7 315 located closest to the hole pixel 300 in a downward direction.

The candidate pixel setting unit 110 may set a candidate pixel C2 using a neighboring pixel 4 320 located closest to the hole pixel 300 in a left direction and a neighboring pixel 5 325 located closest to the hole pixel 300 in a right direction.

The candidate pixel setting unit 110 may set a candidate pixel C3 using a neighboring pixel 1 330 located closest to the hole pixel 300 at a top left corner of a first diagonal line and a neighboring pixel 8 335 symmetric to the neighboring pixel 1 330 with respect to the hole pixel 300. In this instance, the first diagonal line may correspond to a diagonal line from top left to bottom right.

The candidate pixel setting unit 110 may set a candidate pixel C4 using a neighboring pixel 3 340 located closest to the hole pixel 300 at a top right corner of a second diagonal line and a neighboring pixel 6 345 symmetric to the neighboring pixel 3 340 with respect to the hole pixel 300. In this instance, the second diagonal line may correspond to a diagonal line from top right to bottom left.

The candidate pixel setting unit 110 may determine pixel values of the candidate pixels using various methods. The candidate pixel setting unit 110 may determine a pixel value for each candidate pixel by setting a weight value for each neighboring pixel to be inversely proportional to a distance from the hole pixel, and by applying the weight value to a pixel value for each neighboring pixel.

For example, when bilinear interpolation is used, the candidate pixel setting unit 110 may determine pixel values of the candidate pixels C1 through C4 based on Equations 1 through 4.

$$I(C1) = \tfrac{2}{3} I(2) + \tfrac{1}{3} I(7)$$ [Equation 1]

$$I(C2) = \tfrac{1}{2} I(4) + \tfrac{1}{2} I(5)$$ [Equation 2]

$$I(C3) = \tfrac{2}{3} I(1) + \tfrac{1}{3} I(8)$$ [Equation 3]

$$I(C4) = \tfrac{1}{2} I(3) + \tfrac{1}{2} I(6)$$ [Equation 4]

In Equations 1 through 4, I(x) may denote a pixel value of a pixel x, and a denominator may be proportional to a distance between a pair of neighboring pixels, and a numerator may be inversely proportional to a distance between the hole pixel 300 and each neighboring pixel.

The pair of neighboring pixels related to the candidate pixel C1 may include the neighboring pixel 2 310 and the neighboring pixel 7 315. In Equation 1, the denominator may correspond to a distance between the neighboring pixel 2 310 and the neighboring pixel 7 315. The distance between the neighboring pixel 2 310 and the hole pixel 300 may be shorter than the distance between the neighboring pixel 7 315 and the hole pixel 300. Accordingly, the denominator 2 to be multiplied by the pixel value of the neighboring pixel 2 310 may be greater than the denominator 1 to be multiplied by the pixel value of the neighboring pixel 7 315.

As shown in Equation 2, when the distance between the pair of neighboring pixels increases, a magnitude of the denominator may be increased. As shown in Equation 4, when the distance between the pair of neighboring pixels decreases, a magnitude of the denominator may be decreased.

The weight determining unit 120 may determine weight values of the candidate pixels C1 through C4 for the hole pixel 300 to meet the first condition and the second condition. The weight determining unit 120 may determine a first weight value for meeting the first condition and a second weight value for meeting the second condition for each of the candidate pixels C1 through C4, and may determine final weight values of the candidate pixels C1 through C4 using the determined first and second weight values.

As a difference in pixel value between the pair of neighboring pixels symmetric with regard to the hole pixel 300 is smaller, the weight determining unit 120 may determine the weight value of the candidate pixel related to the pair of neighboring pixels to be of a high value. The weight determining unit 120 may determine the first weight value $w_{C1}^1$ of the candidate pixel C1 through the first weight value $w_{C4}^1$ of the candidate pixel C4 based on Equations 5 through 8.

$$w_{C1}^1 = \frac{1}{|I(2) - I(7)| + \varepsilon}$$ [Equation 5]

$$w_{C2}^1 = \frac{1}{|I(4) - I(5)| + \varepsilon}$$ [Equation 6]

$$w_{C3}^1 = \frac{1}{|I(1) - I(8)| + \varepsilon}$$ [Equation 7]

$$w_{C4}^1 = \frac{1}{|I(3) - I(6)| + \varepsilon}$$ [Equation 8]

Here, $w_{CK}^i$ may denote a first weight value of a k-th candidate pixel, and $\varepsilon$ may denote a constant for preventing a denominator from becoming 0. In addition to Equations 5 through 8, the weight determining unit 120 may use an arbitrary function to determine the weight value of the candidate pixel related to the pair of neighboring pixels to be of a high value as a difference in pixel value between the pair of neighboring pixels symmetric with regard to the hole pixel 300 is smaller.

The weight determining unit 120 may determine a distance between the hole pixel 300 and a neighboring pixel closer to the hole pixel 300 among the neighboring pixels related to the candidate pixel, and may determine a second weight value to be inversely proportional to the determined distance. In FIG. 3, the neighboring pixel 2 310 is closer to the hole pixel 300 among the neighboring pixel 2 310 and the neighboring pixel 7 315 related to the candidate pixel C1. The weight determining unit 120 may determine the second weight value of the candidate pixel C1 using the distance 1 between the neighboring pixel 2 310 and the hole pixel 300.

The weight determining unit 120 may determine the second weight value $w_{C1}^2$ of the candidate pixel C1 through the second weight value $w_{C4}^2$ of the candidate pixel C4 based on Equations 9 through 12.

$$w_{C1}^2 = \frac{1}{\min(dist(0, 2), dist(0, 7))}$$ [Equation 9]

$$w_{C2}^2 = \frac{1}{\min(dist(0, 4), dist(0, 5))}$$ [Equation 10]

$$w_{C3}^2 = \frac{1}{\min(dist(0, 1), dist(0, 8))}$$ [Equation 11]

$$w_{C4}^2 = \frac{1}{\min(dist(0, 3), dist(0, 6))}$$ [Equation 12]

Here, min(a,b) may denote a function for determining a smaller value among a value of a and a value of b, and dist(x,y) may denote a function for determining a distance between a pixel x and a pixel y. The distance between the pixel x and the pixel y may be determined using, for example, a Euclidean distance function or a Manhattan distance function.

The weight determining unit 120 may determine the final weight value $w_{C1}$ of the candidate pixel C1 through the final weight value $w_{C4}$ of the candidate pixel C4 based on Equations 13 through 16.

$$w_{C1} = w_{C1}^1 * w_{C1}^2$$ [Equation 13]

$$w_{C2} = w_{C2}^1 * w_{C2}^2$$ [Equation 14]

$$w_{C3} = w_{C1}^1 * w_{C3}^2$$ [Equation 15]

$$w_{C4} = w_{C4}^1 * w_{C4}^2$$ [Equation 16]

The pixel value determining unit 130 may determine a pixel value of the hole pixel 300 using the pixel value I(C1) of the candidate pixel C1 through the pixel value I(C4) of the candidate pixel C4, determined by the candidate pixel setting unit 110, and the final weight value $w_{C1}$ of the candidate pixel C1 through the final weight value $w_{C4}$ of the candidate pixel C4, determined by the weight determining unit 120.

The pixel value determining unit 130 may determine the pixel value of the hole pixel 300 based on Equation 17.

$$I(0) = \frac{1}{W}(w_{C1} \cdot I(C1) + w_{C2} \cdot I(C2) + w_{C3} \cdot I(C3) + w_{C4} \cdot I(C4))$$ [Equation 17]

In this instance, W may be determined using Equation 18.

$$W = w_{C1} + w_{C2} + w_{C3} + w_{C4} \quad \text{[Equation 18]}$$

The image processing apparatus 100 may perform this process iteratively for each hole pixel in the hole area. The image processing apparatus 100 may maintain the hole pixel 300 having the determined pixel value as a hole pixel until the hole area is filled completely, to prevent the hole pixel 300 from serving as a neighboring pixel when determining a pixel value of another hole pixel. Accordingly, when an error occurs in the pixel value of the hole pixel 300, the error may be prevented from affecting the resulting pixel value of another hole pixel.

FIG. 4 illustrates another example of determining a pixel value of a hole pixel according to an example embodiment.

In FIG. 4, candidate pixels may be set using neighboring pixels located in six directions from a hole pixel 400. Also, neighboring pixels located in an arbitrary direction may be used.

The candidate pixel setting unit 110 may set six candidate pixels using neighboring pixels located in six directions from the hole pixel 400.

The candidate pixel setting unit 110 may set a candidate pixel C1 using a neighboring pixel 2 410 located closest to the hole pixel 400 in an upward direction and a neighboring pixel 11 415 located closest to the hole pixel 400 in a downward direction.

The candidate pixel setting unit 110 may set a candidate pixel C2 using a neighboring pixel 6 420 located closest to the hole pixel 400 in a left direction and a neighboring pixel 7 425 located closest to the hole pixel 400 in a right direction.

The candidate pixel setting unit 110 may set a candidate pixel C3 using a neighboring pixel 1 430 located closest to the hole pixel 400 in a left direction of a first diagonal line and a neighboring pixel 10 435 symmetric to the neighboring pixel 1 430 with respect to the hole pixel 400. In this instance, the first diagonal line may correspond to a diagonal line from top left to bottom right.

The candidate pixel setting unit 110 may set a candidate pixel C4 using a neighboring pixel 2 440 located closest to the hole pixel 400 in a left direction of a second diagonal line and a neighboring pixel 12 445 symmetric to the neighboring pixel 2 440 with respect to the hole pixel 400. In this instance, the second diagonal line may correspond to a diagonal line from top left to bottom right, with a different angle from the first diagonal line.

The candidate pixel setting unit 110 may set a candidate pixel C5 using a neighboring pixel 4 450 located closest to the hole pixel 400 in a right direction of a third diagonal line and a neighboring pixel 9 455 symmetric to the neighboring pixel 4 450 with respect to the hole pixel 400. In this instance, the third diagonal line may correspond to a diagonal line from top right to bottom left.

The candidate pixel setting unit 110 may set a candidate pixel C6 using a neighboring pixel 5 460 located closest to the hole pixel 400 in a right direction of a fourth diagonal line and a neighboring pixel 8 465 symmetric to the neighboring pixel 5 460 with respect to the hole pixel 400. In this instance, the fourth diagonal line may correspond to a diagonal line from top right to bottom left, with a different angle from the third diagonal line.

The candidate pixel setting unit 110 may determine pixel values of the candidate pixels using various methods. The candidate pixel setting unit 110 may determine the pixel values of the candidate pixels C1 through C6 by applying, to the neighboring pixel 1 430 through the neighboring pixel 12 445, a denominator being proportional to a distance between a pair of neighboring pixels and a numerator being inversely proportional to a distance between the hole pixel 400 and each of the pair of neighboring pixels. The candidate pixel setting unit 110 may determine the pixel values of the candidate pixels C1 through C6 based on Equations 1 through 4.

The weight determining unit 120 may determine weight values of the candidate pixels C1 through C6 for the hole pixel 400 to meet the first condition and the second condition. The weight determining unit 120 may determine a first weight value for meeting the first condition and a second weight value for meeting the second condition for each of the candidate pixels C1 through C6, and may determine final weight values of the candidate pixels C1 through C6 using the determined first and second weight values.

As a difference in pixel value between the pair of neighboring pixels symmetric with regard to the hole pixel 400 becomes smaller, the weight determining unit 120 may determine the weight value of the candidate pixel related to the pair of neighboring pixels to be of a high value.

The weight determining unit 120 may determine a distance between the hole pixel 400 and a neighboring pixel closer to the hole pixel 400 among the neighboring pixels related to the candidate pixel, and may determine a second weight value to be inversely proportional to the determined distance. In FIG. 4, the neighboring pixel 3 410 is closer to the hole pixel 400 among the neighboring pixel 3 410 and the neighboring pixel 11 415 related to the candidate pixel C1. The weight determining unit 120 may determine the second weight value of the candidate pixel C1 using the distance 1 between the neighboring pixel 3 410 and the hole pixel 400.

The weight determining unit 120 may determine a final weight value for each candidate pixel using the determined first and second weight values.

The pixel value determining unit 130 may determine a pixel value of the hole pixel 400 using the pixel values of the candidate pixels C1 through C6 determined by the candidate pixel setting unit 110, and the final weight values of the candidate pixels C1 through C6 determined by the weight determining unit 120.

The image processing apparatus 100 may perform this process iteratively for each hole pixel in the hole area. The image processing apparatus 100 may maintain the hole pixel 400 having the determined pixel value as a hole pixel until the hole area is filled completely, to prevent the hole pixel 400 from serving as a neighboring pixel when determining a pixel value of another hole pixel. When an error occurs in the pixel value of the hole pixel 400, it may prevent the error from affecting the resulting pixel value of another hole pixel.

Figure 5:
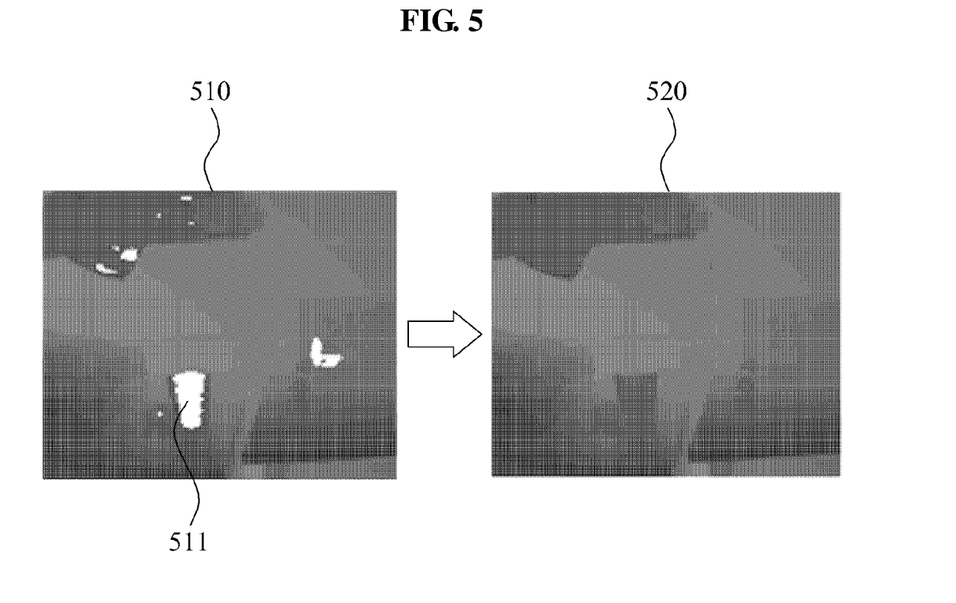
FIG. 5 illustrates an example of an image processing result according to an example embodiment.

FIG. 5 illustrates an example of an image processing result according to an example embodiment.

The image processing apparatus 100 may output a hole-free image or an output image 520 by processing a hole area 511 including at least one hole pixel in an input image 510.

The image processing apparatus 100 may set a plurality of candidate pixels using neighboring pixels of the hole area 511.

The image processing apparatus 100 may determine a pixel value for each of the plurality of candidate pixels by setting a weight value for each neighboring pixel to be inversely proportional to a distance from the hole pixel, and by applying the weight value to a pixel value for each neighboring pixel.

The image processing apparatus 100 may determine a weight value for each of the plurality of candidate pixels for the hole pixel to meet a first condition and a second condition.

The image processing apparatus 100 may determine a pixel value of the hole pixel in the hole area using the pixel value and the weight value for each of the plurality of candidate pixels.

The image processing apparatus 100 may convert the hole pixel into a normal pixel by inputting the determined pixel value of the hole pixel, to fill the hole area 511.

Figure 6:
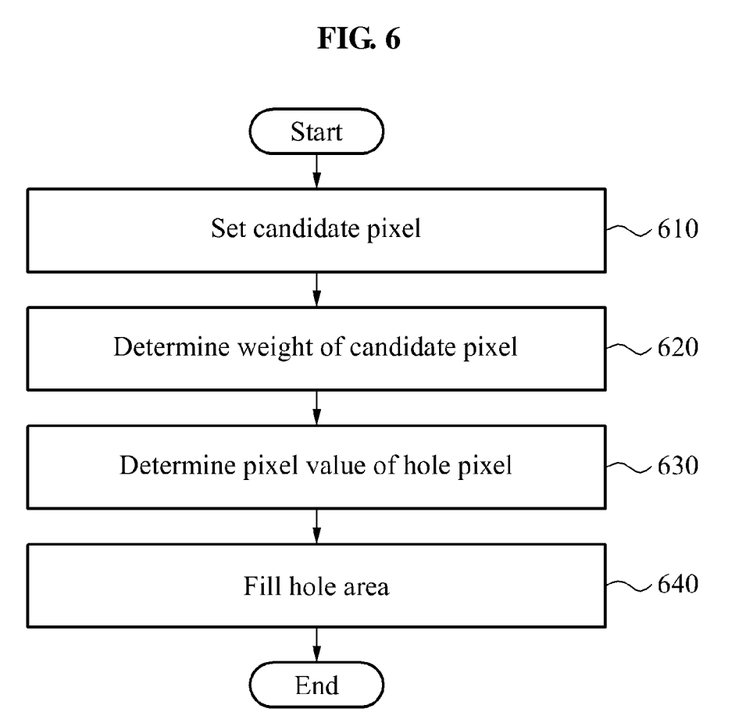
FIG. 6 illustrates a method of processing an image according to an example embodiment.

FIG. 6 illustrates a method of processing an image according to an example embodiment.

In operation 610, the candidate pixel setting unit 110 may set a plurality of candidate pixels corresponding to hole pixel in a hole area using neighboring pixels around the hole area.

The candidate pixel setting unit 110 may set the plurality of candidate pixels using a pair of neighboring pixels in a symmetric arrangement with respect to the hole pixel among the neighboring pixels. The candidate pixel setting unit 110 may set the plurality of candidate pixels using a pair of neighboring pixels in a symmetric arrangement with respect to the hole pixel in at least one direction among a vertical direction, a horizontal direction, and a diagonal direction.

In operation 620, the weight determining unit 120 may determine a weight value for each of the plurality of candidate pixels using neighboring pixels related to the candidate pixel set in operation 610. The weight determining unit 120 may determine a weight value for each of the plurality of candidate pixels for the hole pixel to be determined by the pixel value determining unit 130 to meet a first condition and a second condition.

The weight determining unit 120 may determine the weight value of the candidate pixel using a difference in pixel value between a pair of neighboring pixels in a symmetric arrangement with respect to the hole pixel. To meet the first condition, the weight determining unit 120 may determine the weight value of the candidate pixel to be inversely proportional to the difference in pixel value between the pair of neighboring pixels related to the candidate pixel.

The weight determining unit 120 may determine the weight value of the candidate pixel using a distance between a pair of neighboring pixels in a symmetric arrangement with respect to the hole pixel. To meet the second condition, the weight determining unit 120 may determine the weight value of the candidate pixel to be inversely proportional to the distance between the pair of neighboring pixels related to the candidate pixel.

In operation 630, the pixel value determining unit 130 may apply the weight value determined in operation 620 to the plurality of candidate pixels set in operation 610, and may determine the pixel value of the hole pixel using the plurality of candidate pixels having the weighted pixel values.

In operation 640, the hole area filling unit 140 may convert the hole pixel into a normal pixel by inputting the pixel value of the hole pixel determined in operation 630, to fill the hole area.

The hole area filling unit 140 may maintain the converted normal pixel as a hole pixel until the hole area is filled completely, to disallow the candidate pixel setting unit 110, the weight determining unit 120, and the pixel value determining unit 130 to select the converted normal pixel to be a neighboring pixel.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for processing an image, the apparatus comprising:
    a candidate pixel setting unit to set a plurality of candidate pixels corresponding to at least one hole pixel in a hole area using neighboring pixels around the hole area using at least one pair of neighboring pixels in a symmetric arrangement with respect to the hole pixel among the neighboring pixels; and
    a pixel value determining unit to determine a pixel value of the hole pixel using the plurality of candidate pixels.

2. The apparatus of claim 1, wherein the symmetric arrangement of the neighboring pixels includes at least one of a vertical symmetry, a horizontal symmetry, and a diagonal symmetry.

3. The apparatus of claim 1, wherein each candidate pixel has a pixel value determined using pixel values of the pair of symmetric neighboring pixels and distances between the hole pixel and the pair of symmetric neighboring pixels.

4. An apparatus for processing an image, the apparatus comprising:
    a candidate pixel setting unit to set a plurality of candidate pixels corresponding to at least one hole pixel in a hole area using neighboring pixels around the hole area; a pixel value determining unit to determine a pixel value of the hole pixel using the plurality of candidate pixels; and
    a weight determining unit to determine a weight value of at least one of the candidate pixels using the neighboring pixels,
    wherein the pixel value of the hole pixel is determined by applying the determined weight value to the at least one candidate pixel.

5. The apparatus of claim 4, wherein the weight value is determined by a first weight value, and the first weight value is determined using a difference in pixel value between the pair of neighboring pixels.

6. The apparatus of claim 5, wherein the first weight value is inversely proportional to the pixel value difference.

7. The apparatus of claim 4, wherein the weight value is determined by a second weight value, and the second weight value is determined using a distance between the hole pixel and a neighboring pixel closer to the hole pixel among the pair of neighboring to pixels.

8. The apparatus of claim 7, wherein the second weight value is inversely proportional to a distance between the hole pixel and the neighboring pixel closer to the hole pixel.

9. A method of processing an image, the method comprising:

setting, by an image processing apparatus, a plurality of candidate pixels corresponding to at least one hole pixel in a hole area using neighboring pixels around the hole area using at least one pair of neighboring pixels in a symmetric arrangement with respect to the hole pixel among the neighboring pixels; and determining, by the image processing apparatus, a pixel value of the hole pixel using the plurality of candidate pixels.

10. The method of claim 9, wherein the symmetric arrangement of the neighboring pixels includes at least one of a vertical symmetry, a horizontal symmetry, and a diagonal symmetry.

11. The method of claim 9, wherein each candidate pixel has a pixel value determined using pixel values of the pair of symmetric neighboring pixels and distances between the hole pixel and the pair of symmetric neighboring pixels.

12. A non-transitory computer-readable recording medium comprising a program for instructing a computer to perform the method of claim 9.

13. A method of processing an image, the method comprising:

setting, by an image processing apparatus, a plurality of candidate pixels corresponding to at least one hole pixel in a hole area using neighboring pixels around the hole area;

determining, by the image processing apparatus, a pixel value of the hole pixel using the plurality of candidate pixels; and determining, by the image processing apparatus, a weight value of at least one of the candidate pixels using the neighboring pixels, wherein the pixel value of the hole pixel is determined by applying the determined weight value to the at least one candidate pixel.

14. The method of claim 13, wherein the weight value is determined by a first weight value, and the first weight value is determined using a difference between the pixel values of the pair of neighboring pixels.

15. The method of claim 14, wherein the first weight value is inversely proportional to the pixel value difference.

16. The method of claim 13, wherein the weight value is determined by a second weight value, and the second weight value is determined using a distance between the hole pixel and a neighboring pixel closer to the hole pixel among the pair of neighboring pixels.

17. The method of claim 16, wherein the second weight value is inversely proportional to a distance between the hole pixel and the neighboring pixel closer to the hole pixel.

* * * * *